United States Patent [19]

Wittmann et al.

[11] Patent Number: 5,113,035
[45] Date of Patent: May 12, 1992

[54] DEVICE FOR THE PRODUCTION OF AN OPTICAL WAVEGUIDE PREFORM

[75] Inventors: Manfred Wittmann, Stuttgart; Robert Günther, Elzach, both of Fed. Rep. of Germany

[73] Assignee: Alcatel N.V., Amsterdam, Netherlands

[21] Appl. No.: 658,175

[22] Filed: Feb. 20, 1991

[30] Foreign Application Priority Data

Feb. 23, 1990 [DE] Fed. Rep. of Germany ....... 4005730

[51] Int. Cl.$^5$ ............................................. C03B 37/012
[52] U.S. Cl. ........................................... 65/11.1; 65/2; 65/3.11; 65/4.2; 279/1 DC
[58] Field of Search ............ 65/1, 2, 3.11, 4.2, 65/4.21, 11.1, 13, 12; 279/1 DC, 1 DA

[56] References Cited

U.S. PATENT DOCUMENTS

| | | |
|---|---|---|
| 4,505,729 | 3/1985 | Matsumura et al. ................ 65/3.11 |
| 4,869,743 | 9/1989 | Fitoussi et al. ....................... 65/3.11 |
| 4,925,472 | 5/1990 | Di Vita ................................... 65/2 |

FOREIGN PATENT DOCUMENTS 3506660 8/1986 Fed. Rep. of Germany ....... 65/3.11

Primary Examiner—Robert L. Lindsay
Attorney, Agent, or Firm—Ware, Fressola, Van Der Sluys & Adolphson

[57] ABSTRACT

In the production of an optical waveguide preform, particularly for the production of mono-mode optical waveguides, a tube, or several tubes, of quartz glass are fused onto a crude preform rod of quartz glass. In a known device, the crude preform rod and the quartz glass tube slid over this are clamped at the same end into jaw chucks in the headstock of the glass lathe. Since it happens that optical waveguides that have been drawn from an optical waveguide preform produced with the known device show an inadmissibly high core eccentricity, it is proposed that another jaw chuck be provided in the tailstock for the other end of the tube preform.

8 Claims, 1 Drawing Sheet

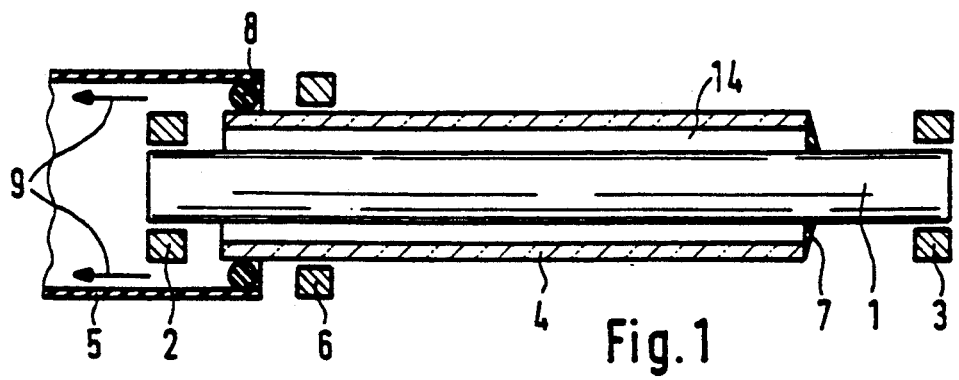
Fig. 1
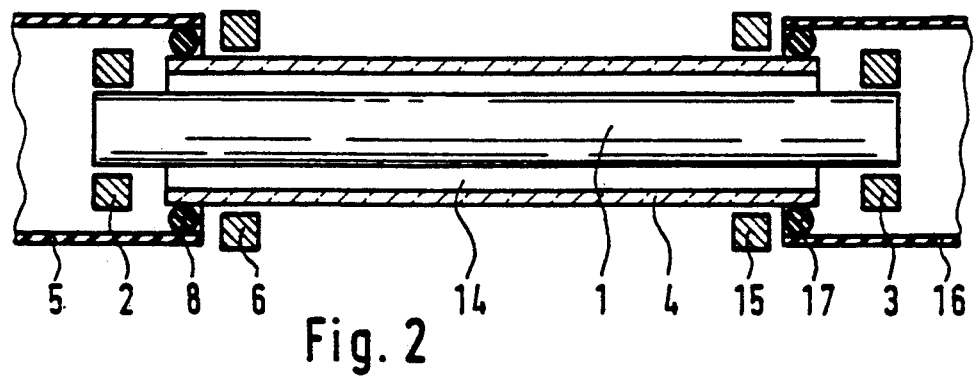
Fig. 2
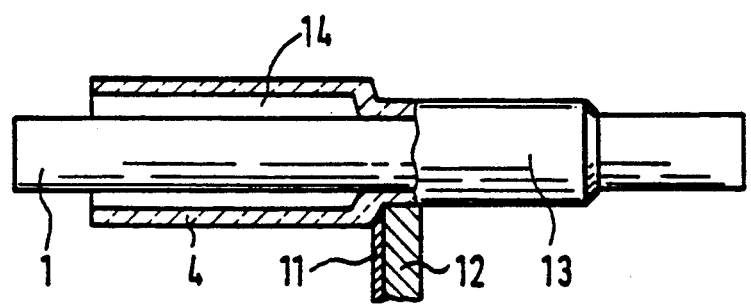
Fig. 3

DEVICE FOR THE PRODUCTION OF AN OPTICAL WAVEGUIDE PREFORM

BACKGROUND OF THE INVENTION

1. Field of the Invention

The invention relates to a device for the production of an optical waveguide preform, and more particularly, to a device for forming a preform from a crude preform rod of quartz glass and at least one quartz glass tube fused thereto. The device consists of a glass lathe in which jaw chucks for the rotatable support of the crude preform rod and of the quartz glass tube are provided in the headstock.

2. Description of the Prior Art

A device of this type is known from German Patent No. 33 15 156. In the known device, the crude preform rod and the quartz glass tube slid over this are clamped at the same end into separate jaw chucks in the headstock of the glass lathe. The fusion of the quartz glass tube onto the crude preform rod is carried out by the fact that a gas burner is led along the rod-tube unit, starting from the unclamped end, while the unit rotates.

When using the known device, it has now been found that the crude preform rod moves away from the joint axis of symmetry of the rod and tube during fusion of the tube. However, this leads to the fact that an optical waveguide drawn from an optical waveguide preform of this type shows an inadmissibly large core eccentricity. Only very narrow tolerances are permitted in the core eccentricity of optical waveguides, because these cause a large attenuation at splice points or in optical waveguide connectors. Furthermore, in the case of the known device, it is not possible to accelerate the production of the optical waveguide preform by the establishment of a vac... n between the crude preform rod and the quartz glass tube.

SUMMARY OF THE INVENTION

The technical problem on which the invention is based consists of changing the known device in such a way that the crude preform rod, during fusion of the quartz glass tube, no longer moves out of the joint axis of symmetry, and the production of the optical waveguide preform can be accelerated.

According to the invention, this technical problem is solved by the fact that an additional jaw chuck for the other end of the crude preform is provided in the tailstock.

The design of the glass lathe according to the invention permits a bilaterally fixed support of the crude preform rod and the quartz glass tube, so that a deviation from the joint axis of symmetry of the crude preform rod and quartz glass tube is no longer possible. The optical waveguide drawn from an optical waveguide preform by means of this device has a very low core eccentricity.

DESCRIPTION OF THE DRAWINGS

The invention is explained below with reference to FIGS. 1-3, in which:

FIG. 1 is a schematic presentation of the device according to the invention.

FIG. 2 is another embodiment of the device according to FIG. 1.

FIG. 3 represents a snapshot in the production of an optical waveguide preform with the device according to FIG. 1.

DETAILED DESCRIPTION OF THE PREFERRED EMBODIMENT

FIG. 1 shows the jaw chuck 2 in the headstock and the jaw chuck 3 in the tailstock of the glass lathe, in which the ends of the crude preform 1 are clamped. The quartz glass tube 4 pushed over the crude preform 1 is clamped at one of its ends in the jaw chuck 6. This end of the quartz glass tube 4 projects into the rotation gasket 5 between whose inner circumference and the surface of the quartz glass tube 4 there is arranged an elastic gasket 8. The right-hand end of the annular gap 14 between the crude preform 1 and the quartz glass tube 4 is closed by means of the gasket 7. The left-hand end of this annular gap, located within the rotation gasket 5, is open. The inner space of the rotation gasket 5 is connected to a vacuum pump, which evacuates the inner space and the annular gap 14 during the fusion of the quartz glass tube 4, as indicated by the arrows 9.

The exemplifying embodiment of the device according to FIG. 2 differs from the exemplifying embodiment according to FIG. 1 by the fact that the right-hand end of the quartz glass tube 4 is also rotatably supported in a jaw chuck 15. In addition, the right-hand end of the quartz glass tube 4 also ends in a rotation gasket 16, between whose inner circumference and the surface of the quartz glass tube 4 there is arranged the elastic gasket 17. The inner space of the rotation gasket 16 can also be connected to the vacuum pump, so that the annular gap 14 can be evacuated and/or flushed from the left and/or right side.

FIG. 3 shows the process during fusion of the quartz glass tube 4.

For this purpose, a gas burner 10 is conducted from right to left along the crude preform 1, which rotates together with the quartz glass tube 4. By means of the gas burner, two zones are produced, namely the collapse zone 11 and the glazing zone 12. After the glazing has taken place, the optical waveguide preform 13 has been formed from the tube preform 1 with the quartz glass tube 4.

What is claimed is:

1. A device for the production of an optical waveguide preform from a crude preform rod of quartz glass and at least one quartz glass tube fused onto the preform rod, said device comprising:
   a glass lathe having separate rotatable jaw chucks (2, 6) at one end for supporting the crude preform rod (1) and the quartz glass tube (4), and another rotatable jaw chuck (3), for supporting the other end of the crude preform rod (1), at the other end of the lathe; and
   means for heating said quartz glass tube.

2. A device for the production of an optical waveguide preform from a crude preform rod of quartz glass and at least one quartz glass tube fused onto the preform rod, said device comprising:
   a glass lathe having separate rotatable jaw chucks at one end for supporting the crude preform rod and the quartz glass tube, and another rotatable jaw chuck at the other end of the lathe, for supporting the other end of the crude preform rod;
   means for heating said quartz glass tube;
   a rotation gasket disposed about the jaw chuck supporting the crude preform rod, said rotation gasket being dimensioned to overlap the end of the quartz glass tube;

an elastic gasket disposed between an outer surface of the quartz glass tube and an inner surface of the rotation gasket; and means for connecting an inner space of the rotation gasket to a vacuum pump.

3. A device according to claim 1, wherein the lathe additionally includes a second rotatable jaw chuck (15) at the other end of the lathe for supporting the other end of the quartz glass tube.

4. A device according to claim 2, wherein the lathe additionally includes a second rotatable jaw chuck (15) at the other end of the lathe for supporting the other end of the quartz glass tube.

5. A device for the production of an optical waveguide preform from a crude preform rod of quartz glass and at least one quartz glass tube fused onto the preform rod, said device comprising:

a glass lathe having a pair of rotatable jaw chucks disposed at one end for supporting the crude preform rod and the quartz glass tube and another pair of rotatable jaw chucks disposed at the end of the lathe for supporting the other end of the crude preform rod and the quartz glass tube;

means for heating said quartz glass tube;

a rotation gasket disposed about one of said rotatable jaw chucks supporting an end of the crude preform rod, said gasket being dimensioned to overlap the corresponding end of the quartz glass tube;

an elastic gasket disposed between the outer surface of the quartz glass tube and an inner surface of the rotation gasket; and means for connecting an inner space of the rotation gasket to a vacuum pump.

6. A device for the production of an optical waveguide preform from a crude preform rod of quartz glass and at least one quartz glass tube fused onto the preform rod, said device comprising:

a glass lathe having a pair of rotatable jaw chucks disposed at one end for supporting the crude preform rod and the quartz glass tube and another pair of rotatable jaw chucks disposed at the other end of the lathe for supporting the other end of the crude preform rod and the quartz glass tube;

means for heating said quartz glass tube;

a rotation gasket disposed over the jaw chuck supporting the crude preform rod at said one end, said rotation gasket being dimensioned to extend over the end of the quartz glass tube at said one end;

an elastic gasket disposed between an outer surface of the quartz glass tube and an inner surface of the rotation gasket;

a rotation gasket disposed about the rotatable jaw chuck supporting the other end of the crude preform rod, said gasket being dimensioned to overlap the other end of the quartz glass tube;

an elastic gasket disposed between the outer surface of the quartz glass tube and an inner surface of the rotation gasket; and means for connecting the inner space of least one of said rotation gaskets to a vacuum pump.

7. A device as described in claim 6, additionally comprising means for connecting the inner space of the other of said rotation gaskets to a vacuum pump.

8. A device for the production of an optical waveguide preform from a crude preform rod of quartz glass and at least one quartz glass tube fused onto the preform rod, said device comprising:

a glass lathe having separate rotatable jaw chucks at one end for supporting the crude preform rod and the quartz glass tube, and another rotatable jaw chuck at the other end of the lathe, for supporting the other end of the crude preform rod;

means for heating said quartz glass tube;

a rotation gasket disposed about one of said jaw chucks supporting an end of the crude preform rod at said one end, said rotation gasket being dimensioned to overlap a corresponding end of the quartz glass tube and an inner surface of the rotation gasket; and means for connecting an inner space of the rotation gasket to a vacuum pump.

* * * * *